United States Patent
Zyss et al.

(10) Patent No.: US 6,884,549 B1
(45) Date of Patent: Apr. 26, 2005

(54) METHOD FOR PHOTOGRAPHIC RECORDING OF AT LEAST A LINEAR AND/OR NON-LINEAR OPTICAL PROPERTY A STRUCTURE COMPRISING AT LEAST A PHOTOSENSITIVE MOLECULAR MATERIAL

(75) Inventors: Jôseph Zyss, Sceaux (FR); Sophie Brasselet, Paris (FR); Eric Toussaere, Paris (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/889,769
(22) PCT Filed: Jan. 21, 2000
(86) PCT No.: PCT/FR00/00145
§ 371 (c)(1), (2), (4) Date: Sep. 24, 2001
(87) PCT Pub. No.: WO00/43995
PCT Pub. Date: Jul. 27, 2000

(30) Foreign Application Priority Data

Jan. 21, 1999 (FR) .......................... 99 00627

(51) Int. Cl.⁷ .............................. G03F 9/00; G03C 1/76
(52) U.S. Cl. ........................... 430/5; 430/30; 430/270.1
(58) Field of Search .......................... 430/5, 320, 321, 430/269, 270.1, 311, 30

(56) References Cited

U.S. PATENT DOCUMENTS

| 4,775,970 A | * | 10/1988 | Ishii .............................. 369/54 |
| 5,179,267 A | * | 1/1993 | Hashimoto et al. .......... 235/454 |
| 5,204,193 A | * | 4/1993 | Sato et al. .................... 428/694 |
| 6,440,638 B1 | * | 8/2002 | Golz et al. .................... 430/313 |

\* cited by examiner

Primary Examiner—Mark F. Huff
Assistant Examiner—Saleha Mohamedulla
(74) Attorney, Agent, or Firm—Blakely Sokoloff Taylor & Zafman

(57) ABSTRACT

The invention concerns a method for photographic recording a spatial distribution of linear and/or non-linear optical properties in a polymer material which consists in irradiating the material to modify the orientation of its molecules. The irradiation direction is perpendicular or oblique relative to the propagation direction(s) of the scanning beams.

50 Claims, 2 Drawing Sheets

Figure 1:
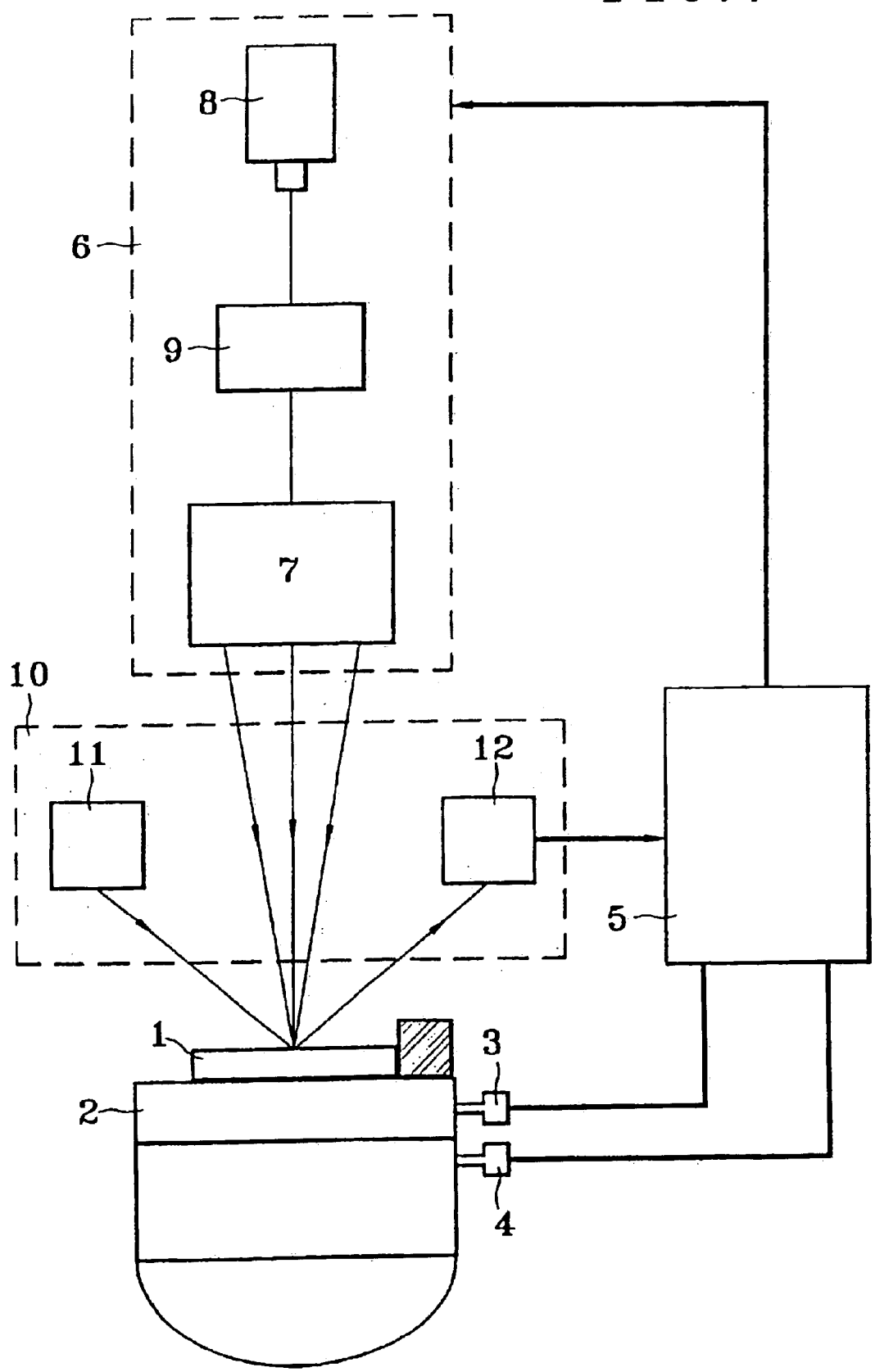

METHOD FOR PHOTOGRAPHIC RECORDING OF AT LEAST A LINEAR AND/OR NON-LINEAR OPTICAL PROPERTY A STRUCTURE COMPRISING AT LEAST A PHOTOSENSITIVE MOLECULAR MATERIAL

The present invention relates to a method of photoinducing at least one linear and/or non-linear optical property in a structure comprising at least one photosensitive molecular material.

It is known that by photoinduction with polarized coherent beams, it is possible to control the local orientation distribution of molecules, for example in an amorphous matrix of the polymer or sol-gel type, thereby modifying the distribution of certain of their linear or non-linear optical properties.

These properties can be refractive index, absorption, susceptibilities that are non-linear, in particular quadratic and cubic, electro- or photo-induced luminescence, photochemistry, photorefractive nature, etc . . .

Coventionally, for writing and reading linear and/or non-linear properties photoinduced by means of coherent beams on a molecular material, use is made of a co-propagating configuration in which the read direction (i.e. the direction of beams leaving the material, conveying the generated optical effect) is identical to the write direction (i.e. the direction of the beams used for photoinduction).

The term "writing" is used herein to mean structuring the photosensitive material so as to confer a property of the above-mentioned kind thereon.

A major difficulty in the photoinduction process is associated with adsorption of the write beam, itself resulting from constraints which require conditions to be used that are necessarily spectrally resonant or quasi-resonant, for reasons of efficiency.

An additional difficulty encountered when it is desired to photoinduce properties requiring a constraint of quasi-phase matching when using the usual co-propagating configuration lies in that the constraint for quasi-phase matching generally makes it necessary to work with write and read resonant wavelengths that are the same (or to make use of high order non-linear processes).

This gives rise to a high degree of absorption in reading which limits the interaction length over which it is possible to work to the penetration depth of the beam(s) absorbed by spectral resonance.

An object of the invention is to mitigate these problems.

There are already known from document:

S. Brasselett et al.: "Control of the polarization dependence of optically poled nonlinear polymer films"—Optic Letter, Vol. 22, No. 19, p.1464–1466, October 1997, methods of photoinducing and reading at least one non-linear optical property in a structure including at least one photosensitive molecular material, in which said structure is irradiated with at least two mutually coherent write light beams to modify the orientation of the molecules of said molecular material, at least one of said beams being suitable for inducing plural-photon absorption in the material.

Those methods are limited by the constraints mentioned-above.

The invention proposes a method of the type characterized in that said structure is an optically confining structure, in that the write beams are parallel to a confinement direction of said structure or oblique relative thereto and distribute the non-linear optical property(ies) over the confining structure in at least one direction perpendicular to said direction in which said structure is confined, and in that one or more "pump" beams is/are caused to propagate in or through said photoinduced structure to generate an optical effect in or through said photoinduced structure from which there results a property in one or more write beams propagating in guided configuration in the photoinduced confining structure.

A multiphoton beam combines emissions which, for an excited material, present the same wavelength, but correspond to different energy transitions in said material.

Naturally, a "pump" beam can also be a read beam.

With the method proposed by the invention, it is possible to write linear optical properties without limit in the direction perpendicular to the confinement direction in which said properties are distributed.

Furthermore, the directions of the write beams and of the read beams are dissociated, thus making it possible, for example, to comply with the constraint for quasi-phase matching without being limited by the dimension of the material in the read direction.

For example, it is possible during a scan to vary the parameters that define the intensities and the polarization and/or phase offsets of the write beams.

In this manner, it is possible to decouple the spectral resonance constraints associated with writing which for reasons of efficiency is performed under conditions that are spectrally resonant or quasi-resonant—from spatial and spectral resonance constraints that might otherwise limit the effectiveness of the device when reading.

In general, this makes it possible, without limit on dimension in the read direction and without destroying the molecules that bear the optical properties, to implement permanent photoinduction of a continuous distribution or a pixel-by-pixel distribution of optical properties, e.g. of a spatio-tensorial distribution of susceptibilities of order n ($\chi''(r)$), where n is a given integer and where r represents the vector coordinate(s) of a current point in the structure.

Furthermore, the methods proposed by the invention are advantageously associated with the various following characteristics taken singly or in any feasible combination:

the confining structure is scanned with at least one write light beam, and one (or more) parameters of at least one of the write beams is/are controlled as a function of relative displacement between said structure and said scanning beam(s);

the writing performed in the irradiated zone by the scanning beam(s) is tested and relative displacement of the confining structure and of the scanning beam(s) is controlled as a function of the result of the test;

the write beams are irradiated through a lens and one or more parameters of at least one of the write beams is/are controlled;

the write beams are irradiated through a mask, and one or more parameters of at least one of the write beams is/are controlled;

the write beams are irradiated through a holographic structure, and one or more of the parameters of at least one of the write beams is/are controlled;

a parameter that is controlled on one or more of the write beams is beam intensity and/or polarization state and/or propagation direction and/or spatial overlap of a plurality of write beams and/or wavelength and/or relative phase between the beams;

a parameter is controlled by generating noise on said parameter and by controlling the statistical characteristics of said noise;

the temperature of the molecular material is controlled;

said temperature is controlled by irradiation by means of an additional beam enabling local heating to be performed at the impact point of said write beams;

the photoinduction beams write a quasi-phase matching grid for propagating the pump beam(s) and the read beam(s);

the molecular material is previously oriented by applying an electric field and/or by heating; and the confining structure is a portion of film and/or a ribbon light guide which extends along the propagation direction of the read beam(s) and/or a microactivity in which the read beam(s) propagate(s) in a loop, and/or an optical fiber, and/or a combination of such elements.

Figure 2A:
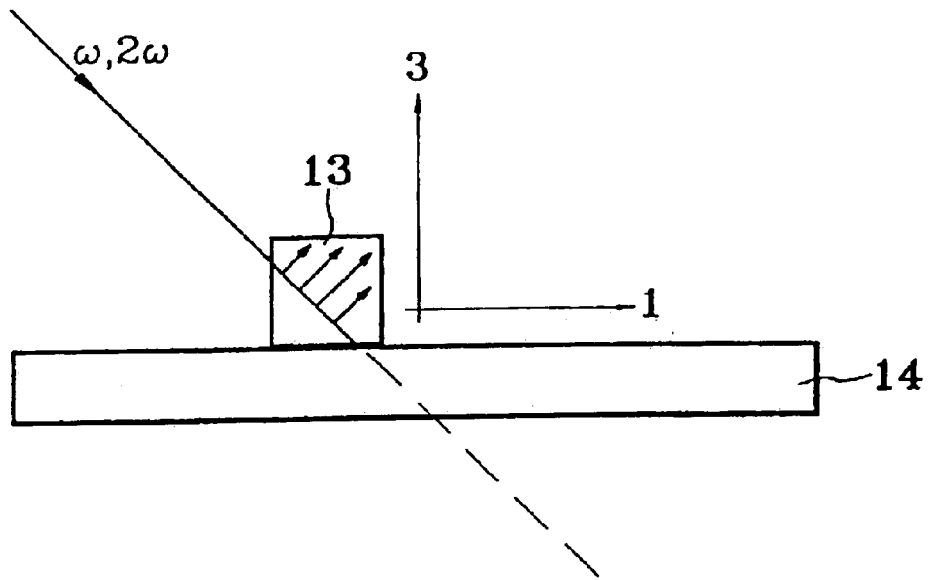
Figure 2B:
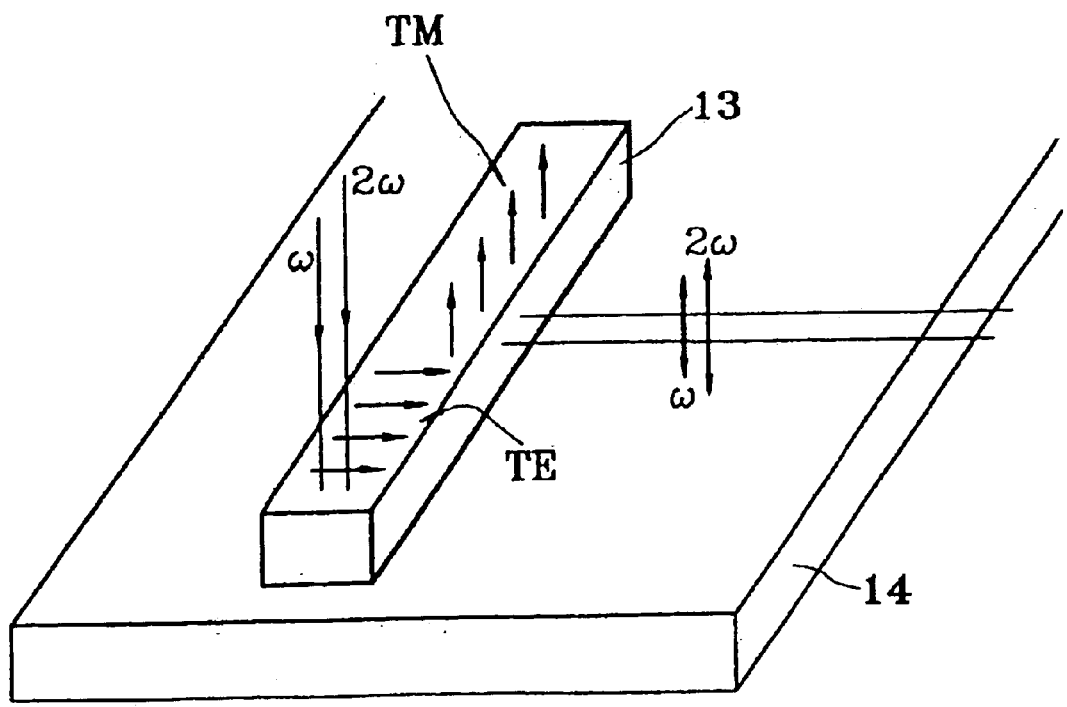

Other characteristics and advantages of the invention appear further from the following description. This description is purely illustrative and non-limiting. It should be read with reference to the accompanying figures, in which:

FIG. 1 is a diagram of a device enabling a method of the invention to be implemented; and FIGS. 2a and 2b are diagrams showing two ways of making a light guide independent of polarization, in a possible implementation of the invention.

The apparatus shown in FIG. 1 uses geometrically transverse illumination to perform photoinduction in a sample 1 (films, light guides, or more complex circuitry) which is made of a material in which certain molecules become reoriented and/or are modified under certain conditions of irradiation. By way of example, such a material is an amorphous or sol-gel material including conjugated non-centrally symmetrical molecules with charge transfer, such as a diazo dye substituted at opposite ends by electron donor and electron acceptor substituents respectively.

The sample 1 is placed on a support 2 mounted on a moving carriage B having degrees of freedom in rotation and in translation. The displacements of the support 2 in rotation and in translation are adjustable in steps of micrometer ($\mu$m) scale via drive means 3, 4 under the control of a computer 5 which manages writing on the sample 1.

The computer 5 determines the various photoconduction parameters and controls in optical unit 6 which generates the beams that irradiate the sample 1.

In the example shown in the figure, which corresponds to photoinducing a $\chi^2$ distribution, there are three of these beams. This number can be reduced to two in a "degenerate" configuration in which the wavelength of the more intense write beam—e.g. in the infrared—, referred to as the "fundamental" beam, is twice that of the less intense beam—then in the visible—and referred to as the "harmonic" beam.

The beams generated by the unit 6 illuminate the substrate constituted by the sample 1 perpendicularly or obliquely relative to the plane in which said substrate extends.

The computer 5 controls the various write parameters as a function of the displacement of said substrate 1 so as to modify continuously, or in pixel mode, the linear or non-linear optical properties (symmetry, amplitude, positioning, various geometrical factors) that are to be photoinduced.

The various write parameters which are controlled so as to obtain a particular $\chi^n$ distribution are as follows:

the intensity of the beams;

their polarization states;

their relative phases;

the propagation directions of the beams;

the spatial overlap between beams;

wavelengths;

temperature, with the substrate possibly being heated by means of a secondary laser beams that produces local heating;

an electric or magnetic field applied to the substrate; etc.

These various parameters can be controlled so as to correspond to deterministic values defined by the computer 5.

In a variant, these parameters can be controlled in statistical manner.

For example, to control phase, it is possible to use an optical plate mounted on a cradle which enables its orientation relative to the write beam to be modified, thereby modifying the optical path length of the beam passing through the plate.

When statistical control is performed, given noise is generated by means of a noise generator, and the movements of the optical plate on its cradle are controlled by the noise signal generated in this way.

By controlling the statistical characteristics of the noise, and in particular its variance, it is possible in succession to generate portions in the irradiated structure in which the molecules are statistically strongly oriented in the same direction (zone in which the noise used for photoinduction corresponds to low variance) and portions in which, on the contrary, the molecules are disordered, each having random orientation (zone in which the noise used for photoinduction corresponds to high variance).

The optical unit 6 includes a parametric oscillator 7 that is optically pumped by a laser 8 which is itself tunable (e.g. a Ti:Sa laser). A frequency doubler or tripler 9 is placed between the laser 8 and the parametric oscillator 7. Thus, three variable wavelengths are available at the outlet from the parametric device, having frequencies $\omega_p$, $\omega_i$, and $\omega_s$ that satisfy the relationship $\omega_p = \omega_i + \omega_s$.

One or more write beams can be used to control photoinduction.

For this purpose, the setup also includes a check unit 10 with a source 11 and a detector 12 respectively for emitting and detecting probe radiation at a check wavelength $\omega_c$ so as to verify the properties that have been photoinduced. For this purpose, it is possible to use one of the write beams, e.g. $\omega_i$.

To modify the intensity of the beams, the optical unit 6 includes a variable attenuator for each of them under the control of the computer 5.

The optical unit 6 also includes defocusing means, means for modifying parametric generation conditions or for doubling frequency at the origin of one or more of the write beams.

It also includes conventional polarizing devices for generating linear, circular, or elliptical polarization states.

In particular, the write block makes it possible to prepare a multipolar configuration having n photons of arbitrary geometry, by implementing polarization states defined by appropriate polarization devices. Such a configuration can be matched to the symmetry of the orientable molecules, themselves constituting physical molecule multipoles so as to optimize the efficiency of photoinduction and obtain good macroscopic susceptibilities.

It includes phase-shifting means such as the index plates of varying thickness.

As will be understood, the computer 5 controls the directions of incidence of the beams relative to the sample 1, their points of impact, and also the various parameters of the optical unit 6 as a function of the desired $\chi^n$ profile.

Naturally, other variants of apparatus for implementing the invention can be envisaged.

In particular, apparatus for implementing the invention can present a sample support that is fixed, e.g. suitable only for initial coarse position adjustment under manual control, with the write unit then itself being movable.

In another variant, provision can be made for both the write block and the sample support to be fixed, irradiation passing through one or more masks or through optical means such as a lens or a holographic structure (a transparent structure presenting a set of gratings or diffraction slots, or any other appropriate holographic recording, for example), or indeed being deflected by an acousto-optical or other device.

In any event, the resulting $\chi^n$ profile confers one or more linear or non-linear optical properties on the photoinduced structure, such as periodic birefrigence for n=1, Pockels effect (linear electro-optical effect) for n=2, in a spatially uniform distribution of properties over the structure, or in a distribution presenting a sequence of orientations that are successively parallel or perpendicular to the substrate if it is a ribbon light guide, a three lightwave mixing effect (generating a second harmonic, frequency sum and difference, parametric amplification, emission, and oscillation, for example).

By way of example, starting with a structure prior to photoinduction that is of the Fabry Perot type having Bragg mirrors and photoinducing a non-linear property (e.g. a quadratic property) in said structure at a spatial periodicity in the propagation direction corresponding to the quasi-phase matching, it is possible to obtain a parametric oscillator. A similar structure without a Bragg mirror constitutes a single-pass parametric amplifier or emitter.

With a parametric emitter or oscillator structure, said structure is used as follows. An intense first beam known as a "pump" is injected into the structure in guided mode and by means of the non-linear property (e.g. a quadratic property) that has previously been photo-induced therein, this beam gives rise to two beams of longer wavelengths, referred to respectively as the "signal" beam and the "complementary" beam, which beams are themselves guided. These two signals constitute the two read signals that are to be provided.

With a parametric amplifier, the signal and the pump are both present at the inlet of the structure. The structure then makes it possible to amplify the signal beam while also generating the complementary beam.

Yet another example can be the case in which photo-induction in an initial Fabry Perot structure makes it possible to obtain a laser structure, or with an initial structure having no Bragg mirrors or any other light feedback device, an amplifier or a light-emitting structure.

By way of example, the Fabry Perot structure is a ribbon light guide structure, an optical fiber structure, or indeed a loop microcavity structure.

Under such circumstances, the photoinduced property is a linear property such as the means orientation of the active molecules which create laser gain (which orientation gives rise to polarized emission).

The resulting photoinduced structure is used as follows. A pump beam is injected either in guided mode, or else across the structure in a single pass configuration parallel or oblique relative to one of the confinement directions of the structure. The laser emission generated in this way by the pump beam at a wavelength which is different from that of the pump beam propagates in a guided mode or a in loop.

In addition, the structure can combine various non-linear or light-emitting or laser properties sequentially (self-doubling laser; non-linear switch, for example).

There follows a detailed description of an embodiment of an irradiation modulating component for a light guide constituted by a polymer layer deposited on a substrate so as to create thereon an electro-optically active zone that is not centrally symmetrical;

The light guide can be constituted by a copolymer of methyl methacrylate and of methyl methacrylate substituted by a dispersed red dye (DR1) at a molar concentration of 30% dye (DR1-MMA) corresponding to a refractive index of 1.6 at a wavelength of 1.32 $\mu$m. This copolymer is deposited on a silicon substrate covered in a 7 $\mu$m layer of silica over a width of 3 $\mu$m with a thickness of 0.9 $\mu$m. The light guide is then covered in a 0.3 $\mu$m thick layer of polymethyl methacrylate (PMMA).

The laser used for irradiation is an neodymium and yttrium aluminum garnet ($Nd_3$+YAG) pulsed source emitting pulses having a duration of 30 picoseconds (ps) at a repetition rate of 30 hertz (Hz) and at a wavelength of 1.064 $\mu$m.

The frequency doubler 9 is a potassium dideuterium phosphate (KDP) crystal in a type II configuration. The beam emitted at the above-mentioned wavelength (frequency $\omega_p$) corresponds to a light flux of 5 gigawatts per square centimeter ($GW/cm^2$), while the beam emitted at the frequency $2\omega_p$ presence flux of 100 megawatts per square centimeter ($MW/cm^2$). Both beams are spread in the light guide direction by cylindrical lenses.

The illuminated length of the light guide is 0.6 cm. Illumination lasts for 1 hour.

The molecules can change in nature during photo-induction (bleaching for example).

This applies in particular for irradiation at an intensity above a modification threshold, in which case the molecules change structure as in controlled manner depending on their orientation.

This can also be the case when instead of DR1, a stilbene analog of DR1 is used (such as a 4–4'dimethyl-aminonitrostilbene (DANS) molecule) presenting irreversible photoisomerization characteristics under the effect of the write beams, leading to a controlled change in orientational manner.

As will be understood, the techniques proposed by the invention are advantageously applicable to photoinducing a spatial distribution of second-order non-linear susceptibilities ($\chi^2$).

To this end, one or more parameters of the write beam are altered periodically during displacement in a given direction parallel to the surface of the sample (e.g. the light guide direction), with a spatial period equal to $2\pi/\Delta\beta$, itself determined from the refractive index dispersion at the frequency of the read wave corresponding to the propagation modes used in reading, in application of the relationship $\Delta\beta=\beta_{\omega p}-\beta_{\omega c}-\beta_{\omega s}$, where $\beta_\omega$ is the effective wave vector corresponding to the propagation used in reading at the angular frequency $\omega$ by $\beta_\omega = n^{eff}_\omega \omega/c$, where $n^{eff}_\omega$ is the effective index of the mode, and where $\omega_p$, $\omega_c$, and $\omega_s$ are the frequencies respectively of the pump beam and of the two read beams constituted by the complementary beam and the signal beam.

This provides a light guide whose quadratic properties are modulated at a spatial period that is matched to reading, thus complying with the constraint for quasi-phase matching for the frequencies of the pump beam and of the read beam.

Such a distribution can also be achieved using a phase mask, or by interference between the pump beam and the read beam (e.g. a harmonic and a fundamental at frequencies $\omega$ and $2\omega$).

By way of example, the inventors have written through a gold mask presenting a grating of period 150 $\mu$m, using a beam of wavelength 488 nanometers (nm), with power of 150 milliwatts (mW) for a period of 15 minutes (min). The polymer was initially uniformly oriented in polar manner without an electric field with the mean orientation of the molecules being perpendicular to the substrate, and it was then irradiated through the mask. The illuminated zones were thus disoriented. This made it possible to alternate between zones having linear optical properties (and not including any non-linearity) and non-linear zones of different orientation.

For writing by interference, it is naturally possible to illuminate the sample with intensity fringes at a single wavelength, the sample being also illuminated uniformly at other wavelengths.

Combining various writing and masking modes makes it possible to envisage new components that are difficult to make under other conditions, for example a quasi-phase matching grating independent of polarization.

It is also possible to make a photoinduced grating by causing polarizations that are kept parallel with the optical fields at frequencies of ω and 2ω to turn continuously with the desired period.

In other variant, if the three beams output from the optical unit 6 are colinear, linearly polarized with mutually parallel polarizations, and propagate perpendicularly to the substrate, then the preponderant term of the $\chi^2$ tensor lies parallel to the common polarization axis of the write beams. If such a configuration is scanned in the direction perpendicular to the common polarization or along a pre-drawn guide, a non-linear configuration is obtained which is favorable to TE modes.

Instead of scanning, it is possible to use a converging cylindrical lens, or a pattern generator (line generator) which enables a large portion to be irradiated.

Similarly, the write beams can be injected through one or more optical fibers, thus making it possible to write locally at the end of the fiber and to perform pixelization on the polymer sample.

In another variant, by combining given scanning with periodic variation in an optical parameter, e.g. phase shift or rotation (attenuation) of write polarizations, it is possible to obtain a light guide which corresponds to quasi-phase matching for a TE mode.

The above-described techniques can be used to make a modulator—or any other devices for processing a signal—independent of polarization by making a series or parallel configuration of light guide segments that are oriented in parallel with the substrate (TE mode) or perpendicularly to the substrate (TM mode) with the latter type of orientation being obtained by electrical orientation.

For a waveguide structure having two confinement directions and an electro-optical function, if the two confinement directions are perpendicular, it is possible to perform photoinduction in a direction that is oblique relative to both of the two confinement directions.

This gives rise to molecule orientation which is likewise oblique relative to the confinement directions making both TE mode and TM mode possible simultaneously. The oblique photoinduction direction is then preferably selected in such a manner that the photoinduction performed ensures $r_{33}=r_{13}$ where, in the notation conventionally used in this field, $r_{33}$ and $r_{13}$ designate the coefficients of the linear electro-optical tensor.

In a variant, when the confining structure is that of a light guide confined in two confinement directions, a first portion is irradiated on a direction parallel to a first confinement direction and then a second portion is irradiated along a direction parallel to the second confinement direction, and then again along a direction parallel to the first confinement direction but with a phase offset of π, and so on.

It is thus possible to write a succession of portions on the polymer light guide structure in which the molecules are oriented successively perpendicularly to the first confinement direction, then perpendicularly to the second confinement direction, and then, if so desired, in the opposite direction to the first orientation perpendicular to the first confinement direction and then further on an orientation that is opposite to the second orientation perpendicular to the second confinement direction.

It will be understood that such a light guide constitutes a guide that is independent of polarization and which presents the advantage of being particularly easy to implement.

Examples of this kind are shown in FIGS. 2a and 2b, where the light guide is referenced 13, and the substrate carrying it is referenced 14.

The proposed method can also be used for making transversely-oriented parametric or laser microcavities.

To this end, the sample is inserted between Bragg mirrors so as to give the assembly a high resonance factor for propagation perpendicular to the substrate. For example, a polymer is deposited on a Bragg mirror by spinning and a second mirror is placed facing the first.

By varying the write optical parameters, the optical properties of the microcavity are modulated in space (laser, optical parametric oscillator (OPO) or low threshold frequency mixer, optical logic bistable device).

The mirror strip can be centered on infrared at around 1.3 μm. Writing is performed in the transparent zone of the mirrors at 0.532 μm and 1.064 μm by all-optical orientation.

It will be understood that the invention described above can present numerous applications, in particular for making optical components for telecommunications or instrumentation, such as the following components:

a modulator that is not sensitive to the polarization of the guided waves, a polarization controller, a TE/TM polarization converter;

a frequency mixer or doubler;

a parametric oscillator, emitter, and amplifier;

an optically or electrically pumped light-emitting or laser device with polarized emission;

an optically or electrically pumped amplifier that is sensitive to polarization;

a mixer for heterodyning;

a device for performing non-linear holography for reading in the infrared;

a device (e.g. a "non-linear test pattern") for spatio-tensorial field mapping by electro-optical sampling;

a parametric-effect laser (micro)cavity presenting a matrix or oriented molecules;

a data storage device: coupling the write beams by means of a microscope device such as a conforcal microscopic makes it possible to reduce the scale of the photo-orientation phenomenon to that of a single molecule or a molecular cluster. This makes it possible to use laser beams to manipulate the orientation of single molecular objects and thus obtain rewritable molecular memories having a plurality of states, and linear or non-linear reading;

a data display device: the orientation device can be used in particular for orienting light-emitting molecules for light-emitting screens, or to orient liquid crystal matrices containing molecules that are sensitive to coupling with the field for liquid crystal screens or devices; and the use of this apparatus for disorienting (or bleaching) to erase previously stored optical information, or for local phototherapy of polymer based optical circuitry. The use of non-linear processes in this case (e.g. two-photon absorption process) makes it possible to obtain better depth selectivity in the sample.

What is claimed is:

1. A method of photoinducing at least one linear and/or non-linear optical property in a structure comprising at least one photosensitive molecular material, the method comprising:
   irradiating said structure with at least two mutually coherent write light beams to modify the orientation of the molecules of said molecule material and/or the nature of the molecules as a function of their orientation, said structure is a confining structure, in that the write beams are parallel to a confinement direction or oblique relative thereto and distribute the linear and/or non-linear optical property(ies) over said confining structure in at least one direction perpendicular to said confinement direction, and
   causing one or more "-pump-" beams to propagate in or through said photoinduced structure, with propagation thereof in or through said photoinduced structure generating an optical effect giving rise to a property in one or more "-read-" beams propagating in guided configuration in the photoinduced confining structure.

2. The method according to claim 1 between the confining structure is scanned with at least one write light beam, and in that one (or more) parameters of at least one of the write beams is/are controlled as a function of relative displacement between said structure and said scanning beam(s).

3. The method according to claim 2, the writing performed in the irradiated zone by the scanning beam(s) is tested and relative displacement of the confining structure and of the scanning beam(s) is controlled as a function of the result of the test.

4. The method according to claim 1, wherein the write beams are irradiated through a lens and in that one or more parameters of at least one of the write beams is/are controlled.

5. The method according to claim 1, wherein the write beams are irradiated through a mask, and in that one or more parameters of at least one of the write beams is/are controlled.

6. The method according to claim 1, wherein the write beams are irradiated through a holographic structure, and in that one or more of the parameters of at least one of the write beams is/are controlled.

7. The method according to claim 6, wherein a parameter that is controlled on one or more of the write beams is beam intensity and/or polarization state and/or propagation direction and/or spatial overlap of a plurality of write beams and/or wavelength and/or relative phase between the beams.

8. The method according to claim 7, wherein a parameter is controlled by generating noise on said parameter and by controlling the statistical characteristics of said noise.

9. The method according to claim 1, wherein the temperature of the molecular material is controlled.

10. The method according to claim 1, wherein said temperature is controlled by irradiation by means of an additional beam enabling local heating to be performed at the impact point of said write beams.

11. The method according to claim 1, wherein the photoinduction beams write a quasi-phase matching grid for propagating the pump beam(s) and the read beam(s).

12. The method according to claim 1, wherein the molecular material is previously oriented by applying an electric field and/or by heating.

13. The method according to claim 1, wherein the confining structure is a portion of film and/or a ribbon light guide which extends along the propagation direction of the read beam(s) and/or a microcavity in which the read beam(s) propagate(s) in a loop, and/or an optical fiber, and/or a combination of such elements.

14. A method of photoinducing at least one linear and/or non-linear optical property in a structure comprising at least one photosensitive molecule material, the method comprising:
   irradiating said structure with a multiphoton write light beam to modify the orientation of the molecules of said molecular material and/or the nature of the molecules as a function of their orientation, said structure is a confining structure, in that the write beams are parallel to a confinement direction or oblique relative thereto and distribute the linear and/or non-linear optical property(ies) over said confining structure in at least one direction perpendicular to said confinement direction, and
   causing one or more "-pump-" beams caused to propagate in or through said photoinduced structure, with propagation thereof in or through said photoinduced structure generating an optical effect giving rise to a property in one or more "-read-" beams propagating in guided configuration in the photoinduced confining structure.

15. The method according to claim 14, wherein the confining structure is scanned with at least one write light beam, and in that one (or more) parameters of at least one of the write beams is/are controlled as a function of relative displacement between said structure and said scanning beam(s).

16. The method according to claim 15 wherein the writing performed in the irradiated zone by the scanning beam(s) is tested and relative displacement of the confining structure and of the scanning beam(s) is controlled as a function of the result of the test.

17. The method according to claim 14, wherein the write beams are irradiated through a lens and in that one or more parameters of at least one of the write beams is/are controlled.

18. The method according to claim 14, wherein the write beams are irradiated through a mask, and in that one or more parameters of at least one of the write beams is/are controlled.

19. The method according to claim 14, wherein the write beams are irradiated through a holographic structure, and in that one or more of the parameters of at least one of the write beams is/are controlled.

20. The method according to claim 19, wherein a parameter that is controlled on one or more of the write beams is beam intensity and/or polarization state and/or propagation direction and/or spatial overlap of a plurality of write beams and/or wavelength and/or relative phase between the beams.

21. The method according to claim 20, wherein a parameter is controlled by generating noise on said parameter and by controlling the statistical characteristics of said noise.

22. The method according to claim 14, wherein the temperature of the molecular material is controlled.

23. The method according to claim 14, wherein said temperature is controlled by irradiation by means of an additional beam enabling local heating to be performed at the impact point of said write beams.

24. The method according to claim 14, wherein the photoinduction beams write a quasi-phase matching grid for propagating the pump beam(s) and the read beams(s).

25. The method according to claim 14, wherein the molecular material is previously oriented by applying an electric field and/or by heating.

26. The method according to claim 14, wherein the confining structure is a portion of film and/or a ribbon light guide which extends along the propagation direction of the read beam(s) and/or a microcavity in which the read beam(s) propagate(s) in a loop, and/or an optical fiber, and/or a combination of such elements.

27. A method of photoinducing at least one linear and/or non-linear optical property in a structure comprising at least one photosensitive molecular material, the method comprising:
  irradiating said structure with at least two mutually coherent write light beams which intensity, polarization states, relative phases, propagation direction, spatial overlap and wavelengths are controlled, to modify the orientation of the molecules of said molecular material and/or the nature of the molecules as a function of their orientation, said structure is a confining structure, in that the write beams are parallel to a confinement direction or oblique relative thereto and distribute the linear and/or non-linear optical property(ies) over said confining structure in at least one direction perpendicular to said confinement direction, and
  causing one or more "-pump-" beams caused to propagate in or through said photoinduced structure, with propagation thereof in or through said photoinduced structure generating an optical effect giving rise to a property in one or more "-read-" beams propagating in guided configuration in the photoinduced confining structure.

28. The method according to claim 27, wherein the confining structure is scanned with at least one write light beam, and in that one (or more) parameters of at least one of the write beams is/are controlled as a function of relative displacement between said structure and said scanning beam(s).

29. The method according to claim 28, wherein the writing performed in the irradiated zone by the scanning beam(s) is tested and relative displacement of the confining structure and of the scanning beam(s) is controlled as a function of the result of the test.

30. The method according to claim 27, wherein the write beams are irradiated through a lens and in that one or more parameters of at least one of the write beams is/are controlled.

31. The method according to claim 27 wherein the write beams are irradiated through a mask, and in that one or more parameters of at least one of the write beams is/are controlled.

32. The method according to claim 27, wherein the write beams are irradiated through a holographic structure, and in that one or more of the parameters of at least one of the write beams is/are controlled.

33. The method according to claim 32, wherein a parameter is controlled by generating noise on said parameter and by controlling the statistical characteristics of said noise.

34. The method according to claim 27 wherein the temperature of the molecular material is controlled.

35. The method according to claim 27, wherein said temperature is controlled by irradiation by means of an additional beam enabling local heating to be performed at the impact point of said write beams.

36. The method according to claim 27, wherein the photoinduction beams write a quasi-phase matching grid for propagating the pump beam(s) and the read beam(s).

37. The method according to claim 27, wherein the molecular material is previously oriented by applying an electric field and/or by heating.

38. The method according to claim 27, wherein the confining structure is a portion of film and/or a ribbon light guide which extends along the propagation direction of the read beam(s) and/or a microcavity in which the read beam(s) propagate(s) in a loop, and/or an optical fiber, and/or a combination of such elements.

39. A method of photoinducing at least one linear and/or nonlinear optical property in a structure comprising at least one photosensitive molecular material the method comprising:
  irradiating said structure with a multiplication write light beam which intensity, polarization state, propagation direction, wave length, are controlled or with at least two mutually coherent write light beams to modify the orientation of the molecules of said molecular and/or the nature of the molecules as a function of their orientation, said structure is a confining structure, in that the write beams are parallel to a confinement direction or oblique relative thereto and distribute the linear and/or non-linear optical property(ies) over said confining structure in at least one direction perpendicular to said confinement direction, and
  causing one or more "-pump-" beams caused to propagate in or through said photoinduced structure, with propagation thereof in or through said photoinduced structure generating an optical effect giving rise to a property in one or more "-read-" beams propagating in guided configuration in the photoinduced confining structure.

40. The method according to claim 39, wherein the confining structure is scanned with at least one write light beam, and in that one (or more) parameters of at least one of the write beams is/are controlled as a function of relative displacement between said structure and said scanning beam(s).

41. The method according to claim 40, wherein the writing performed in the irradiated zone by the scanning beam(s) is tested and relative displacement of the confining structure and of the scanning beam(s) is controlled as a function of the result of the test.

42. The method according to claim 39, wherein the write beams are irradiated through a lens and in that one or more parameters of at least one of the write beams is/are controlled.

43. The method according to claim 39, wherein the write beams are irradiated through a mask, and in that one or more parameters of at least one of the write beams is/are controlled.

44. The method according to claim 39, wherein the write beams are irradiated through a holographic structure, and in that one or more of the parameters of at least one of the write beams is/are controlled.

45. The method according to claim 39, wherein a parameter is controlled by generating noise on said parameter and by controlling the statistical characteristics of said noise.

46. The method according to claim 39, wherein the temperature of the molecular material is controlled.

47. The method according to claim 39, wherein said temperature is controlled by irradiation by means of an additional beam enabling local heating to be performed at the impact point of said write beams.

48. The method according to claim 39, wherein the photoinduction beams write a quasi-phase matching grid for propagating the pump beam(s) and the read beam(s).

49. The method according to claim 39, wherein the molecular material is previously oriented by applying an electric field and/or by heating.

50. The method according to claim 39, wherein the confining structure is a portion of film and/or a ribbon light guide which extends along the propagation direction of the read beam(s) and/or a microcavity in which the read beam(s) propagate(s) in a loop, and/or an optical fiber, and/or a combination of such elements.

* * * * *